Patented Mar. 10, 1936

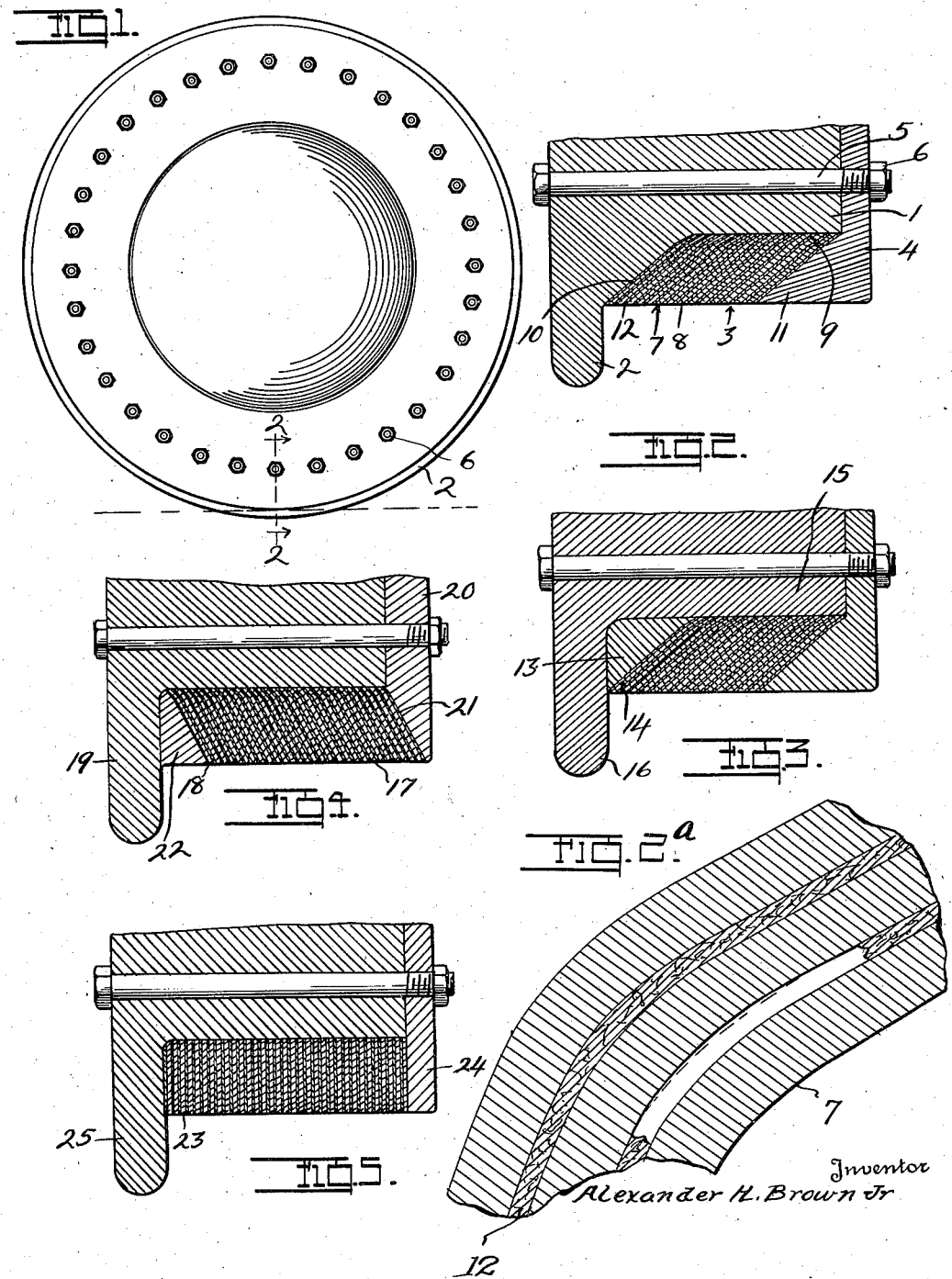

2,033,876

UNITED STATES PATENT OFFICE 2,033,876

RIM CONSTRUCTION

Alexander H. Brown, Jr., Brooklyn, N. Y., assignor, by mesne assignments, to Transit Research Corporation, New York, N. Y., a corporation of New York Application May 3, 1933, Serial No. 669,228

7 Claims. (Cl. 295—31)

This invention relates to vehicle wheels of the type suitable for use on rail vehicles and has for its object to provide a rail contacting tread or tire therefor which has long wearing qualities and which will be quiet in operation.

It is known that various machine elements are more quiet in operation if they be fabricated from laminations. On the same theory, a laminated tire for rail service is more quiet during operation and it is therefore the prime object of this invention to provide a tire fabricated of laminations in such manner that it will give satisfactory service over a long period of time.

Gears and other machine elements always operate against smooth surfaces. However, in the case of a rail contacting tire the rail is rough, there are cross overs and rail joints to be constantly encountered and the tire is subjected generally to very severe conditions. It is therefore an object of this invention to provide thin laminations of equal diameter and of hard metal, such as sheet steel, and to maintain them in assembly under continuous compression of such magnitude as to be capable of resisting deformation during service.

In the case of planar laminations, it has been found difficult to prevent sand and gravel from working between the laminations, thereby causing local distortion and consequently an irregular track surface. It is therefore another object to provide laminations which, in preferred forms are of such shape that all tendencies to distort will be resisted by a number of other laminations and that such resistance will be offered circumferentially of all the laminations. More specifically, it is an object to provide laminations of frusto-conical shape adapted to nest one within the other and to enhance the springiness of the assembly by forming that portion of each lamination adjacent the wheel rim as a different frusto-cone of less slope, so that each lamination may be said to be composed of two frusto-cones in series. A further object of the invention is to provide a tire as above described and to increase the sound deadening qualities thereof by inserting between the laminations a material, such as shellac, cloth canvas, fibre, lead, and the like.

Another object is to provide a wheel rim particularly adapted to receive such a tire as is described above in order to maintain the tire under the most favorable operating conditions.

Other objects and advantages, either directly described or indirectly accruing from the favorable relation of parts, will become hereinafter more fully apparent as reference is had to the accompanying drawing, wherein my invention is illustrated by way of example and not in a limiting sense, and in which Figure 1 is a side elevation of a wheel embodying my invention;

Figure 2 is a cross section on the line 2—2 of Figure 1;

Figure 2a is an enlarged view of a portion of Figure 2.

Figures 3, 4, and 5 are views similar to Figure 2 showing modifications.

As illustrated in Figures 1, 2, and 2a, the wheel is designed for use in rail vehicles and has the rim member 1, the flange 2, the tread or tire 3, and the ring 4. The flange is annular and, as shown, is integral with the rim member and extends radially beyond the periphery of the tire to contact with the rail and serve in guiding the wheel. The ring is detachably secured to the edge of the rim member opposite the flange by suitable means, such as the bolts 5 and the nuts 6.

The tire is formed of the thin circular metallic laminations 7 which are formed of hard metal, such as sheet steel, and which serve as wear elements or tread elements for contacting with the rail. The laminations are individually yieldable or resilient ring members which are alike and have equal external diameters and also equal internal diameters. These laminations have close fitting engagement with the periphery of the rim member. The laminations are frusto-conical and angularly disposed with respect to the periphery of the rim member, when viewed in cross section. Also the laminations nest one within the other and to increase the springiness of the assembly, each lamination has the inner and outer frusto-conical portions 8 and 9 respectively which connect into each other, the inner frusto-conical portion having less slope than the outer frusto-conical portion. These inner frusto-conical portions imperfectly nest within each other.

The laminations 7 are inclined outwardly toward the flange 2 and this flange has the integral portion 10 presenting a face corresponding to the shape of the adjacent lamination. The ring 4 has the overhanging portion 11 presenting a face corresponding to the face of the adjacent lamination. As a result, the flange and the ring nest with the laminations respectively adjacent thereto, the nesting, however, being imperfect. To increase the sound deadening properties of the tire, I provide the spacer means 12 between and separating the laminations. This spacer means is in the nature of thin layers of sound deadening material, such as shellac, cloth, canvas, fibre, lead, and the like, with a layer between adjacent laminations.

The ring 4 is of heavy and substantial construction and is adapted to be effectively secured in place to maintain the laminations in assembly under continuous compression of such magnitude that the laminations are capable of resisting deformation during service. Also the compression is such that a frictional locking engagement is set up between the adjacent laminations and the laminations respectively adjacent the flange and the ring. Furthermore, the construction is such that all loadings and consequently tendencies to distort will be resisted by a number of laminations and that such resistance will be offered over their entire circumferences.

Figure 3 shows a modification which differs mainly from the construction shown in Figures 1 and 2 in that the ring 13 is provided for nesting within the innermost lamination 14. This ring is formed separately from the rim member 15 and the rail contacting flange 16 and it presents a face conforming to the shape of the adjacent lamination.

In the modification shown in Figure 4, the tire is formed of the frusto-conical laminations 17 with the layers 18 of sound deadening material therebetween, the laminations and layers being of the same construction as those of Figures 1 and 2. However, the laminations are inclined outwardly away from the rail contacting flange 19 and the retaining ring 20 presents the face 21 conforming to the shape of the adjacent lamination. In this modification, a separate ring 22 is provided encircling the rim member and abutting the flange 19 and overhanging the adjacent lamination and presenting a face conforming to the shape thereof.

As shown in Figure 5, the laminations 23 are planar ring members which are maintained in assembly under continuous compression in the same manner as the laminations of the previous constructions, the heavy ring member 24 and the rail contacting flange 25, however, presenting planar faces opposed to the laminations.

What I claim as my invention is:

1. A tire for rail vehicles, comprising a plurality of similar thin circular metallic laminations, each of frusto-conical shape, said laminations being adapted to imperfectly nest one within another, whereby relative radial movement under impact and interference of respective sound vibrations result, and means for maintaining said laminations in compressed nested assembly.

2. A tire for rail vehicles, comprising a plurality of similar circular metallic laminations each formed as the frustums of two cones in series, said laminations being adapted to imperfectly nest one within the other, whereby relative radial movement under impact and interference of respective sound vibrations result, and means for retaining said laminations in nested assembly.

3. In a wheel for rail vehicles, a flange and rim member, a plurality of frusto-conical metallic tread elements encircling said rim member in close fitting engagement with the periphery thereof and imperfect fitting engagement with each other whereby relative radial movement under impact and interference of respective sound vibrations result, and means for maintaining said laminations in nested assembly on said rim member.

4. In a wheel for rail vehicles, a flange and rim member, a plurality of frusto-conical metallic tread elements each encircling said rim member in close fitting engagement with the periphery thereof and imperfect fitting with each other whereby relative radial movement under impact and interference of respective sound vibrations result, thin spacer means separating said laminations each from each, and means for maintaining said laminations in fixed nested assembly on said rim member.

5. In a wheel for rail vehicles, a flange and rim member, a plurality of thin frusto-conical metallic tread elements each encircling said rim member in close fitting engagement with the periphery thereof and imperfect fitting with each other whereby relative radial movement under impact and interference of respective sound vibrations result, sound insulating layers spacing said laminations each from each and means for maintaining said laminations in compressed assembly on said rim member.

6. In a wheel for rail vehicles, rim member and a rail contacting flange integral therewith, a laminated tire comprising a plurality of imperfectly fitting similar circular metallic elements, each of said elements being composed of a plurality of definitely sloped frustrated cones integrally secured together, a substantially non-resilient material slightly separating said laminations each from each, whereby relative radial movement under impact and interference of respective sound vibrations result, and means for maintaining said laminations in nested assembly on said rim member.

7. In a wheel for rail vehicles, a flange and rim member and a plurality of imperfectly fitting metallic ring members encircling said rim and constituting tread elements, said ring members being angularly disposed with respect to the periphery of said rim member when viewed in cross section whereby relative radial movement under impact and interference of respective sound vibrations result.

ALEXANDER H. BROWN, Jr.